Figures 1, 2:
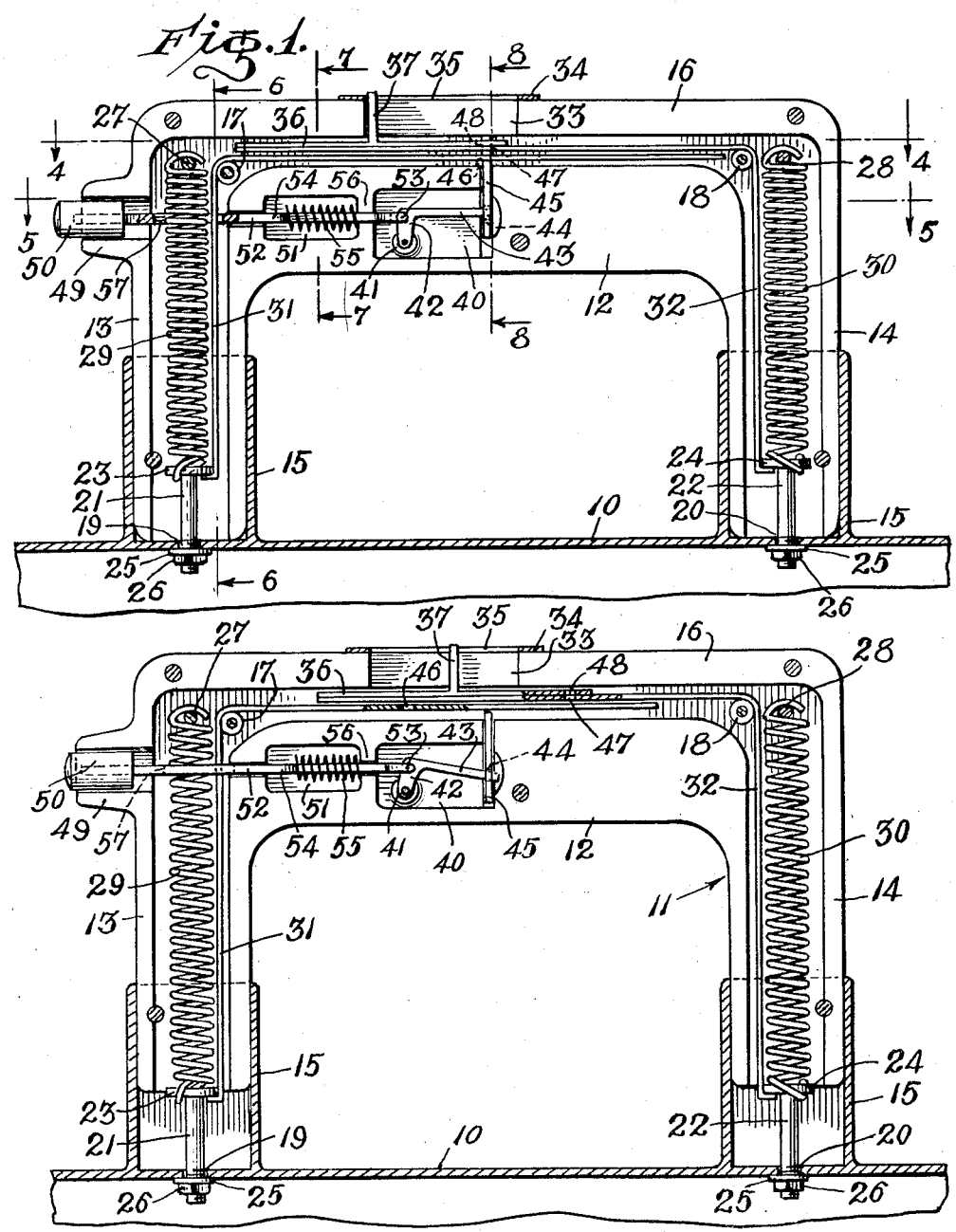

Aug. 21, 1956

W. J. WHITE 2,759,577

WEIGHING DEVICE FOR BAGGAGE

Filed Dec. 2, 1955

2 Sheets-Sheet 1

INVENTOR.
William John White
BY
Felix A. Russell
ATTORNEY.

Aug. 21, 1956  W. J. WHITE  2,759,577
WEIGHING DEVICE FOR BAGGAGE
Filed Dec. 2, 1955  2 Sheets-Sheet 2
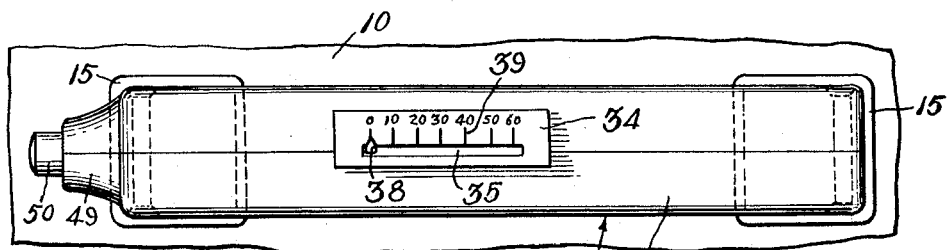
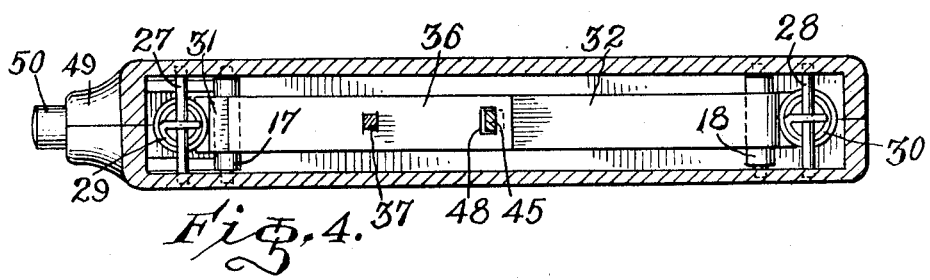
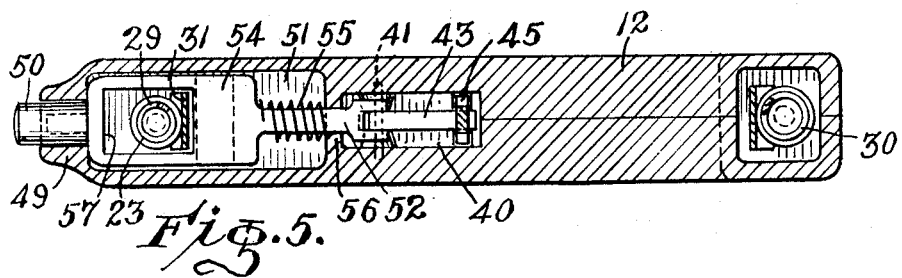
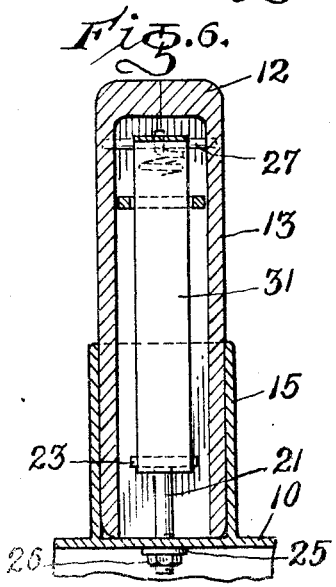
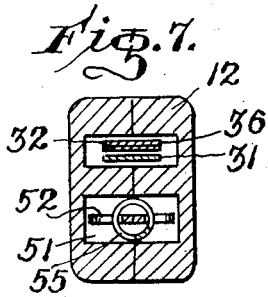
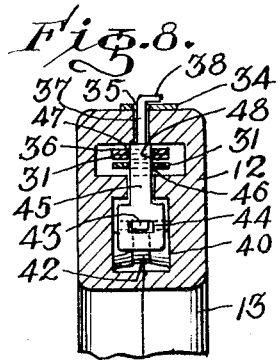
INVENTOR.
William John White
BY
Felix A. Russell

United States Patent Office 2,759,577
Patented Aug. 21, 1956

2,759,577

WEIGHING DEVICE FOR BAGGAGE

William John White, Fort Lauderdale, Fla.

Application December 2, 1955, Serial No. 550,717

4 Claims. (Cl. 190—42)

The present invention relates to a weighing device for baggage and it consists in the combinations, constructions and arrangements of parts herein described and claimed.

Generally the present invention constitutes an improvement over my former Patent No. 2,710,083, patented June 7, 1955. The device essentially consists of a handle which may be attached to a bag or the like and which interiorly includes a weighing mechanism which is normally locked in inactive position but which may be released by pressure upon a button mounted in the handle whereupon the weight of the bag and contents may be indicated upon a scale likewise mounted in the handle.

It is accordingly an object of the invention to provide a novel weighing device for baggage and the like.

Another object of the invention is to provide a combined baggage handle and weighing scale.

Still another object of the invention is to provide, in a device of the character set forth, novel push button operating means forming a part of the invention.

A still further object of the invention is the provision, in a device of the character set forth, of novel locking and release means forming parts of the invention.

Other and further objects of the invention will become apparent from a reading of the following specification taken in conjunction with the drawings, in which:

Figure 1 is a vertical longitudinal sectional view of an embodiment of the invention illustrating the same in locked condition, Figure 2 is a view similar to Figure 1 but showing the device in unlocked and weighing condition, Figure 3 is a plan view of the device illustrated in Figure 1, Figure 4 is a sectional view taken along line 4—4 of Figure 1, Figure 5 is a sectional view taken along line 5—5 of Figure 1, Figure 6 is a sectional view taken along line 6—6 of Figure 1, Figure 7 is a sectional view taken along line 7—7 of Figure 1, and Figure 8 is a sectional view taken along line 8—8 of Figure 1.

Referring more particularly to the drawings, there is shown therein a bag 10 to the top side of which there is affixed a handle structure generally indicated at 11 and which consists of a hollow inverted U-shaped handle 12 provided with dependent legs 13 and 14 which are slidably mounted in sockets 15 which are affixed in any suitable manner to the top of the bag 10.

The handle 12 is provided with a hollow bight portion 16 in one end portion of which there is mounted transversely a roller 17 and in the other end portion a roller 18.

Extending through the top of the bag 10 through openings 19 and 20 terminating at their upper ends in the two sockets 15 are bolts 21 and 22. The bolts 21 and 22 are provided with heads 23 and 24, respectively, at their upper ends with washers 25 and nuts 26 at their lower ends. Transversely mounted in the upper ends of the hollow leg members 13 and 14 are pins 27 and 28, respectively. A tension spring 29 interconnects the head 23 and pin 27 while a tension spring 30 interconnects the head 24 and pin 28.

A flexible steel tape 31 is affixed to the head 23 and extends thence upwardly over the roller 17 and thence toward the roller 18, terminating at a point adjacent thereto. A like tape 32 is affixed at its lower end to the head 24 and extends upwardly therefrom over the roller 18 and thence horizontally toward the roller 17, terminating at a point adjacent to the latter.

A longitudinally extending slot 33 is formed in the upper face of the bight portion 16 and a plate 34 is mounted thereover and provided with a registering slot 35.

A mounting plate 36 is affixed atop the free end portion of the tape 32 in any suitable manner and has extending centrally and upwardly therefrom a pointer 37. The pointer 37 extends through the slots 33 and 35 and has its upper free end bent horizontally and transversely with respect to the longitudinal axis of the bight portion 16, as indicated at 38, and is adapted to cooperate with a scale 39 provided upon the upper face of the plate 34.

The bight portion 16 is substantially centrally provided with a recess 40 through which extends transversely a pin 41 to which is pivoted the lower end of a lever 42 from the upper end of which extends laterally an integrally formed arm 43 the free end portion of which extends through an opening 44 in the lower end of a locking dog 45. The horizontal portions of the tapes 31 and 32 are respectively provided with openings 46 and 47 and the plate 36 is provided with an opening 48 which is always in registry with the opening 47.

A protuberance 49 is integrally formed with the upper portion of the outer face of the leg 13 and has horizontally and slidably mounted therein a push button 50. A recess 51 is provided in the lower portion of the bight portion 16 between the protuberance 49 and the recess 40.

A shaft 52 is affixed to the inner portion of the push button 50 and extends horizontally through the recess 51 into the recess 40 where it is pivotally connected, as indicated at 53, to the upper end of the lever 42. Within the recess 51 the shaft 52 is provided with an enlarged portion 54 and a compression spring 55 surrounds the shaft 52 within the recess 51 and bears against the enlarged portion 54 at one of its ends and against a wall 56 dividing the recesses 40 and 51.

In operation, it will be apparent that with the bag at rest upon a floor or the like, the openings 46, 47 and 48 will register vertically and that the locking dog 45 will be forced upwardly therethrough due to the action of the spring 55 which will act to move the shaft 54 to the left as viewed, for example, in Figures 1 and 2, thus moving the lever 42 in a counterclockwise direction and the arm 43 likewise in a counterclockwise direction thus lifting the locking dog 45. In this condition, it will be apparent that the indicator 37—38 will register "zero" upon the scale 39 and that the bag 10 may be carried from place to place without bringing into operation the mechanism of the weighing scale forming the present invention.

When, however, it is desired to weigh the bag 10 and its contents, it is only necessary to press the push button 50 inwardly with respect to the protuberance 49 thus moving the shaft 52 to the right against the action of the spring 55 thus causing the lever 42 to move in a clockwise direction and the arm 43 to likewise move in a clockwise direction thus forcing the locking dog 45 downwardly out of registry with the openings 46, 47 and 48, as viewed, for example, in Figures 1 and 2. This section brings the mechanism to the position shown in Figure 2.

When such action occurs, it will be apparent that the bag 10 and its contents will now act as a downward force upon the bolts 21 and 22 against the action of the tension springs 29 and 30. Since the tapes 31 and 32 are free to move due to the fact that the locking dog 45 has been removed from contact therewith, it will be apparent that the indicator 37—38 will now be caused to move to the right, as viewed in Figures 1 and 2, to thus indicate upon the scale 39 the exact weight of the bag 10 and its contents.

When the bag and contents have thus been weighed, it is only necessary to again set the bag 10 upon a surface such as a floor or the like whereupon the device will return to its normal locked condition as shown in Figure 1. The enlarged portion 54 of the shaft 52 is provided with an opening 57 for the reception therethrough of the spring 29 and tape 31.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with a bag having a top, the provision of a pair of upwardly extending sockets affixed to said top, an inverted U-shaped handle having each of its legs telescopically mounted in a socket, a roller transversely mounted in each end of the bight portion of said handle, a pair of bolts each affixed to the top within a socket, a pin transversely mounted in each end of the bight portion of the handle, a tension spring interconnecting each pin with the upper end of one of said bolts, a pair of flexible steel tapes each affixed at its lower end to one of said bolts and each entrained over one of said rollers, said tapes having their free end portions extending horizontally in overlapped relationship in the bight portion of said handle, said bight portion having a longitudinal slot in the upper face thereof, a vertically extending pointer affixed to the horizontal portion of the uppermost of said tapes and extending through said slot, and a scale plate mounted on said handle adjacent said slot and readable with said pointer.

2. A device as defined in claim 1 having means for latching said tapes against relative movement.

3. A device as defined in claim 1 having means for latching said tapes against relative movement, said means comprising a vertically slidable locking dog mounted in the bight portion of said handle, said horizontal portions of said tapes each having an opening therein, said openings being in normal vertical registry, a vertically extending lever pivoted at its lower end in said handle, said dog having an arm-receiving opening therein, an arm extending laterally from the upper end of the lever and having its free end in said arm-receiving opening, a protuberance formed in the upper portion of the outer face of one leg of said handle, a push button slidably mounted in said protuberance, a shaft affixed at one end to the inner end of said button and pivotally connected at its other end to the upper end of said lever, and a compression spring mounted in said handle and engageable with said shaft to normally urge said shaft outwardly whereby to force said dog into locking engagement with said tapes.

4. A device as defined in claim 3 wherein said shaft is provided with an enlarged portion having a relatively large opening therein for the reception therethrough of an adjacent tension spring and its associated tape.

References Cited in the file of this patent
UNITED STATES PATENTS 2,710,083  White _____ June 7, 1955